April 28, 1925.
H. S. HELLER
PORTABLE ICE MACHINE
Filed July 11, 1922
1,535,603
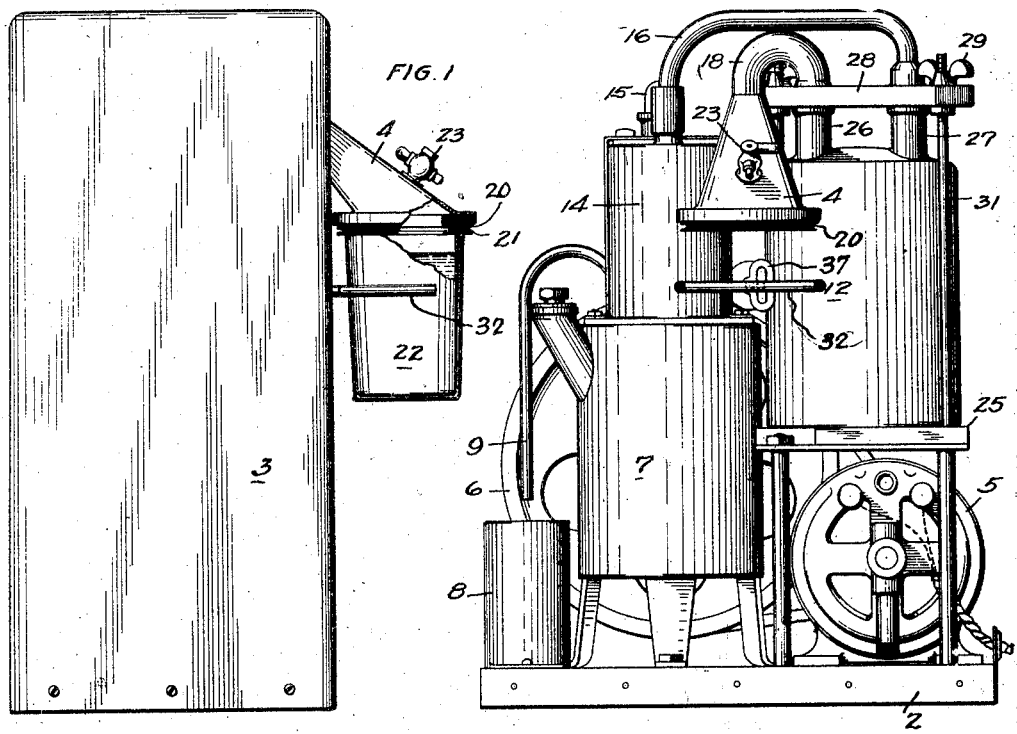
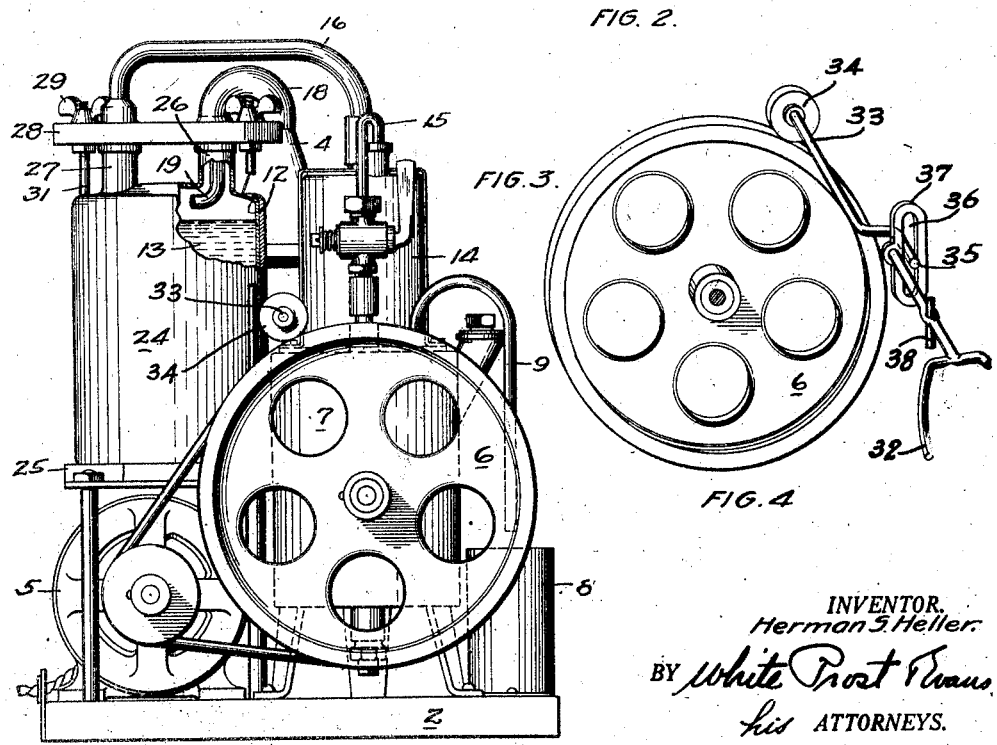
INVENTOR.
Herman S. Heller.
BY *White Prost Evans*
his ATTORNEYS.

Patented Apr. 28, 1925.

1,535,603

UNITED STATES PATENT OFFICE.

HERMAN S. HELLER, OF SAN FRANCISCO, CALIFORNIA, ASSIGNOR TO HELLER PRODUCTS COMPANY, INC., OF LOS ANGELES, CALIFORNIA, A CORPORATION OF CALIFORNIA.

PORTABLE ICE MACHINE.

Application filed July 11, 1922. Serial No. 574,258.

*To all whom it may concern:*

Be it known that I, HERMAN S. HELLER, a citizen of the United States, and a resident of the city and county of San Francisco, State of California, have invented a certain new and useful Portable Ice Machine, of which the following is a specification.

The invention relates to small portable ice making or liquid refrigerating machines.

An object of the invention is to provide a portable machine for producing small quantities of ice or for cooling small quantities of liquid.

Another object of the invention is to provide a self contained machine to which a small quantity of liquid in a receptacle, may be applied to reduce the temperature of or freeze the liquid.

The invention possesses other advantageous features, some of which with the foregoing will be set forth at length in the following description where I shall outline in full, that form of the invention which I have selected for illustration in the drawings accompanying and forming part of the present specification. In said drawings I have shown one form of machine embodying my invention but it is to be understood that I do not limit myself to such form, since my invention, as set forth in the claims, may be embodied in a plurality of forms.

Referring to said drawings:

Figure 1 is a side elevation of a machine embodying my invention, part thereof being broken away to disclose the construction.

Fig. 2 is a front elevation of the machine with the enclosing casing removed.

Fig. 3 is a rear elevation of the machine with the enclosing casing removed parts thereof being broken away to disclose the construction.

Fig. 4 is a detail in perspective of one form of means for agitating the liquid containing vessel.

In the drawings, the invention is shown embodied in a small portable machine for freezing or reducing the temperature of small quantities of liquid, and is particularly adapted for household use or on the dining table for freezing or reducing the temperature of a glass or cup of liquid. It is to be understood however that the invention is not limited to such use, since it manifestly has other adaptations.

The present device comprises a base 2 upon which the various elements of the machine are arranged. The various elements are enclosed in a casing 3, attached to the base, the casing being preferably enameled, so that it presents a pleasing appearance. All of the mechanism is enclosed within the case, with the exception of a head 4, which projects from the casing.

The machine comprises generally an exhaust or vacuum pump, a motor for actuating the pump and a container connected to the pump and containing a charge of hygroscopic material, that is, a material which has a strong tendency to absorb water. The charge of hygroscopic material is disposed so that it will be in close relation to the container of liquid to be frozen, so that the vapor released by the liquid will be quickly absorbed. The liquid to be frozen is subjected to the action of a vacuum, so that the rate of evaporation of the liquid is greatly increased and the water released by the evaporation is rapidly absorbed by the hygroscopic material. By establishing a condition which is conducive to rapid evaporation, and by rapidly removing the evaporated liquid, evaporation at a rapid rate is assured, and since evaporation is accompanied by absorption of heat, the heat is rapidly extracted from the liquid, causing its temperature to drop rapidly.

Arranged on the base is an electric motor 5 which is belted to the drive wheel 6 of a vacuum or exhaust pump 7. The moving parts of the exhaust pump are bathed in oil and a receptacle 8 is arranged under the discharge pipe 9 of the pump, to catch any oil that may be discharged from the pump. The intake side of the exhaust pump is connected to the container 12 in which there is a charge 13 of hygroscopic material and a trap 14 is disposed between the pump and the container 12 to catch any of the hygroscopic material which may be carried over. The exhaust pump is connected to the trap by a conduit 15, opening into the top of the trap and the trap is connected to the container 12 by a conduit 16 opening into the top of the trap and into the top of the container. In the present instance, the hygroscopic material employed is commercial sulphuric acid. The vacuum head 4 is connected to the container 12 by a conduit 18, which terminates within the container above the liquid, in a tangentially disposed spout 19, whereby a gentle surface agitation of the sulphuric acid is produced when the machine is in operation. The head 4, is provided at its end with a seat in which there is disposed a washer 21 of rubber or other conformable material. The washer is preferably made long and provided with a central section 20 of greater flexibility, usually produced by narrowing the material at the central portion of the washer, to permit the liquid holding vessel to be agitated without breaking the seal. The material to be frozen is introduced into a cup or glass 22, preferably having heat insulating sides and bottom and the mouth of the glass or cup pressed against the washer, where it will be held by the vacuum produced. The head is provided with a relief valve 23 for releasing the vacuum when it is desired to remove the glass.

The container 12 is made of glass and is enclosed in a lead sheath 24, to retain the acid in the event of breakage of the container and the conduits 18 and 16 are also formed of lead, so that they will not be injured by contact with the sulphuric acid. I have found that one and one-half quarts of sulphuric acid will serve to accomplish the production of about thirty pounds of ice before it loses its power to absorb moisture at a rapid rate. The container 12 is arranged so that it may be readily removed for re-charging with fresh acid or to permit the insertion of a container charged with fresh acid. The container is mounted on a stand 25 and is provided with inlet and outlet openings 26 and 27 above the level of the acid. The ends of the conduits 16 and 18 are formed to fit snugly and tightly over these openings and are preferably secured to a bar 28 which is removably held in place by wing nuts 29 on the bolts 31.

The vacuum pump produces a vacuum in the glass or cup above the level of the liquid therein, increasing the rate of evaporation of the liquid. When the vacuum has been established there is substantially no flow of air through the conduit 18, which is charged with water vapor. This vapor is absorbed by the acid, causing a flow of the vapor through the conduit, thus causing further evaporation which results in a continuous reduction of temperature of the liquid until it becomes frozen.

I have found that the liquid in the cup freezes with greater rapidity and uniformity, if the liquid is agitated while being subjected to the action of the vacuum. I accomplish agitation of the liquid by agitating the cup. Projecting from the casing below the head is a fork 32, the arms of which are disposed to lie on opposite sides of the cup and in contact therewith, and means are provided within the casing for vibrating the fork. Engaging the wheel 6 and secured to a shaft 33 journaled within the casing, is a wheel 34. The shaft 33 is provided on its end with a crank 35, the arm of which engages in a slot 36 in a plate 37 secured to the end of the fork 32. The fork is supported on vertical pivots 38 journaled in brackets secured to the case. When the motor is in operation, the fork is vibrated laterally, agitating the cup and the liquid therein, to cause it to freeze more uniformly.

I claim:

1. In a refrigerating apparatus, means for producing a vacuum, a container for liquid to be cooled, means whereby the liquid may be subjected to the vacuum, so that rapid evaporation may result, a container for holding hygroscopic material for absorbing the evaporated liquid, and means whereby the liquid container may be agitated while maintaining the other container stationary.

2. In a refrigerating apparatus, means for producing a vacuum, means whereby liquid to be cooled may be subjected to the vacuum, so that rapid evaporation thereof may result, a container adapted to hold a fluid for absorbing the vapors from the liquid, and a conduit connecting the container with the space above the liquid, said conduit terminating in a horizontal position above the absorbent in the container, to aid in agitating said absorbent.

3. In a refrigerating apparatus, a mechanism for producing a vacuum, a container for liquid to be cooled, means whereby the liquid may be subjected to the vacuum, so that rapid evaporation may result, a container for holding an absorbent for the evaporated liquid, and a common means for driving the vacuum producing mechanism and for agitating the container, while maintaining the container for the absorbent stationary.

4. In a refrigerating apparatus, means for producing a vacuum, a container for a liquid to be cooled, means whereby the liquid may be subjected to the vacuum, so that rapid evaporation may result, means for absorbing the evaporated liquid, and means whereby the liquid container may be agitated while maintaining the absorbing means stationary.

5. In a refrigerating apparatus, means for producing a vacuum, a container for a liquid to be cooled, means whereby the liquid may be subjected to the vacuum, so that rapid evaporation may result, means for absorbing the evaporated liquid, and means whereby the container may be agitated while maintaining the absorbing means stationary, comprising a fork, and means for vibrating the fork.

6. In a refrigerating apparatus, means for producing a vacuum, a head connected to the vacuum producing means, a vessel for holding a liquid to be cooled, means for absorbing the evaporated liquid, a conformable, stationary seat on the head for the vessel, whereby it is held in place thereon by the vacuum, and means for agitating the vessel while it is held on the seat and while maintaining the seat stationary.

7. In a refrigerating apparatus, means for producing a vacuum, a head connected to the vacuum producing means, a vessel for holding a liquid to be cooled, means for absorbing the evaporated liquid, a conformable seat on the head for the vessel, whereby it is held in place thereon by the vacuum, and means for agitating the vessel while maintaining the head stationary.

8. In a refrigerating apparatus, means for producing a vacuum, means for absorbing the vapors from liquid to be cooled, and means whereby said liquid may be subjected to the vacuum, whereby rapid evaporation may result, comprising a flexible connection arranged to communicate with a vessel holding the liquid to be cooled, and also communicating with the partial vacuum, and means for mechanically agitating said vessel while in communication with the connection, and while the remaining elements of the device remain relatively stationary.

In testimony whereof, I have hereunto set my hand.

HERMAN S. HELLER.